(12) United States Patent
Butt

(10) Patent No.: US 11,812,726 B2
(45) Date of Patent: Nov. 14, 2023

(54) WINDOW/DOOR MOUNTED PET ENCLOSURE

(71) Applicant: Jessica Butt, Everett, WA (US)

(72) Inventor: Jessica Butt, Everett, WA (US)

(*) Notice: Subject to any disclaimer, the term of this patent is extended or adjusted under 35 U.S.C. 154(b) by 0 days.

(21) Appl. No.: 17/407,611

(22) Filed: Aug. 20, 2021

(65) Prior Publication Data

US 2021/0378209 A1    Dec. 9, 2021

Related U.S. Application Data

(60) Provisional application No. 63/221,288, filed on Jul. 13, 2021.

(51) Int. Cl.
*A01K 1/035* (2006.01)
*A01K 1/03* (2006.01)
*E06B 7/32* (2006.01)

(52) U.S. Cl.
CPC . *A01K 1/03* (2013.01); *E06B 7/32* (2013.01)

(58) Field of Classification Search
CPC ........ A01K 1/0017; A01K 1/03; A01K 1/031; A01K 1/035; A01K 1/02; A01K 1/0236; A01K 1/0245; A01K 1/033; A01K 1/034; E06B 7/32; E06B 9/52; E06B 9/521; E06B 2009/524; E06B 2009/525; A63H 33/046
See application file for complete search history.

(56) References Cited

U.S. PATENT DOCUMENTS

| | | | | |
|---|---|---|---|---|
| 4,788,934 A * | 12/1988 | Fetter | ................... | A01K 1/0353 D30/114 |
| 5,261,350 A * | 11/1993 | Vavrek | ................. | A01K 1/0353 119/484 |
| 5,535,804 A * | 7/1996 | Guest | ....................... | E06B 7/32 160/180 |
| 5,649,500 A * | 7/1997 | Klavemann | ............ | A01K 15/02 119/484 |
| 6,029,609 A * | 2/2000 | Bahar | .................... | A01K 1/035 119/474 |
| 6,394,035 B1 * | 5/2002 | Hill | ......................... | A01K 1/035 119/482 |
| 8,484,896 B1 * | 7/2013 | Skubiak, Jr. | .............. | E06B 9/52 160/369 |
| 9,339,006 B1 * | 5/2016 | Eby | ........................ | A01K 1/034 |
| 2004/0194725 A1 * | 10/2004 | Ozeri | ..................... | A01K 1/033 119/484 |

(Continued)

FOREIGN PATENT DOCUMENTS

| | | | | |
|---|---|---|---|---|
| CA | 2143572 A1 * | 3/1996 | ............... | E06B 7/32 |
| KR | 20180025549 A * | 3/2018 | ............... | E06B 9/52 |

*Primary Examiner* — Peter M Poon
*Assistant Examiner* — Danielle A Clerkley
(74) *Attorney, Agent, or Firm* — Barry Choobin; Patent 360

(57) ABSTRACT

A pet enclosure mounting assembly that can include a first frame that includes a front panel and a rear panel, the first frame configured to circumscribe an opening in a mesh screen and a second frame that is configured to circumscribe an opening in the outdoor pet enclosure. Each the first frame and the second frame have a plurality of magnets configured to magnetically coupled the first frame to the second frame. The first frame and the second frame form a passage for a pet to move from indoors into the outdoor pet enclosure and from the outdoor pet enclosure into the indoors.

7 Claims, 2 Drawing Sheets

(56) References Cited

U.S. PATENT DOCUMENTS

| | | | |
|---|---|---|---|
| 2005/0263091 A1* | 12/2005 | Knapp | A01K 1/033 |
| | | | 119/484 |
| 2006/0042558 A1* | 3/2006 | Stephens | A01K 1/033 |
| | | | 119/484 |
| 2008/0196673 A1* | 8/2008 | Cudia | A01K 31/08 |
| | | | 52/582.1 |
| 2019/0230895 A1* | 8/2019 | Lin | A01K 1/035 |

* cited by examiner

ND/DOOR MOUNTED PET
ENCLOSURE

CROSS-REFERENCE TO RELATED APPLICATIONS

This application claims priority from the U.S. provisional patent application Ser. No. 63/221,288, filed on Jul. 13, 2021, which is incorporated herein by reference in its entirety.

FIELD OF INVENTION

The present invention pertains to a pet enclosure mounting assembly, and more particularly, the present invention relates to a pet door and mounting assembly for mounting an outdoor pet enclosure to a window or door.

BACKGROUND

Pets enjoy the outdoors and always like to take a jaunt outside from time to time relishing the landscape and outdoor air. Generally, an attendant takes the pet outdoor for a walk or any outdoor activity, while the pets remain under observance of the attendant for the safety of the pet. However, the attendant may not be available all the time. Most working adults have to leave their pets unattended at home all day while they work. Being at home, the tight schedule of the attendants may not allow frequent outdoor visits with their pets. Most cats and dogs spend most of their time indoors only.

Outdoor pet enclosures are known in the art that provides safe access of pets to the outdoors in the absence of the attendants. For example, KITTYWALK™ portable outdoor pet enclosure is commercially available that is a mesh enclosure for keeping pets safe from mosquitoes and predators. However, installing such pet enclosures can be laborious and time-consuming. Often, professional services may be needed to install the pet enclosure that can become costly.

Therefore, a desire is there for an outdoor pet enclosure mounting assembly that can provide unattended access to the pets for passing in and out of the door/window.

Hereinafter, the terms "door" and "window" are used interchangeably and connote a door or a window in a home.

SUMMARY OF THE INVENTION

The following presents a simplified summary of one or more embodiments of the present invention in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to a pet enclosure mounting assembly for mounting an outdoor pet enclosure to a door.

It is another object of the present invention that the pet enclosure mounting assembly can provide a passage in the door that allows a pet to freely move between an indoor and the outdoor pet enclosure.

It is still another object of the present invention that the pet enclosure mounting assembly can be quickly and easily installed.

It is yet another object of the present invention that the pet enclosure mounting assembly can be installed to a mesh screen of a door.

It is a further object of the present invention that the pet enclosure mounting assembly can be quickly and easily dismantled.

In one aspect, disclosed is a pet enclosure mounting assembly that can include a first frame that includes a front panel and a rear panel, the first frame configured to circumscribe an opening in a mesh screen, wherein the front panel and the rear panel are configured to sandwich a portion of the mesh screen along the opening of the mesh screen, wherein the front panel is secured to the rear panel using a plurality of fasteners; a second frame that includes a front panel and a rear panel, the front panel and the rear panel of the second frame configured to sandwich a portion of a mesh of an outdoor pet enclosure along an opening of the outdoor pet enclosure, the second frame configured to circumscribe the opening of the outdoor pet enclosure; and each the first frame and the second frame has a plurality of magnets configured to magnetically coupled the first frame to the second frame. The first frame and the second frame form a passage for a pet to move from indoors into the outdoor pet enclosure and from the outdoor pet enclosure into the indoors. The plurality of fasteners can be clips.

In one aspect, disclosed is a method for mounting an outdoor pet enclosure to a mesh screen of a door or window, the method includes the steps of providing the pet enclosure mounting assembly; positioning the front panel of the first frame over the mesh screen; cutting a section of the mesh screen along an inner periphery of the front panel of the first frame to form the passage; positioning the rear panel of the first frame over the front panel of the first frame sandwiching a portion of the mesh screen along the passage; fastening the front panel and the rear panel of the first frame using a plurality of fasteners; sandwiching a portion of a mesh of the outdoor pet enclosure along an enclosure opening in the outdoor pet enclosure between the front panel and the rear panel of the second frame, wherein the second frame circumscribes the enclosure opening; and magnetically coupling the second frame to the first frame, wherein the passage and the enclosure opening forms a path for a pet to enter the outdoor pet enclosure from another side of the door or window.

These and other objects and advantages of the embodiments herein and the summary will become readily apparent from the following detailed description taken in conjunction with the accompanying drawings.

BRIEF DESCRIPTION OF THE DRAWINGS

The accompanying figures, which are incorporated herein, form part of the specification and illustrate embodiments of the present invention. Together with the description, the figures further explain the principles of the present invention and to enable a person skilled in the relevant arts to make and use the invention.

DETAILED DESCRIPTION

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprise", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention, since the scope of the invention will be best defined by the allowed claims of any resulting patent.

Disclosed is a pet enclosure mounting assembly that can be installed in a door for providing an access to a dog or a cat to freely pass through the door without any assistance. The disclosed pet enclosure mounting assembly can be installed in a mesh screen of the door. A flap can also be provided to close the access as and when required, for example, a flap can slidably move between an open and close position.

Figure 1:
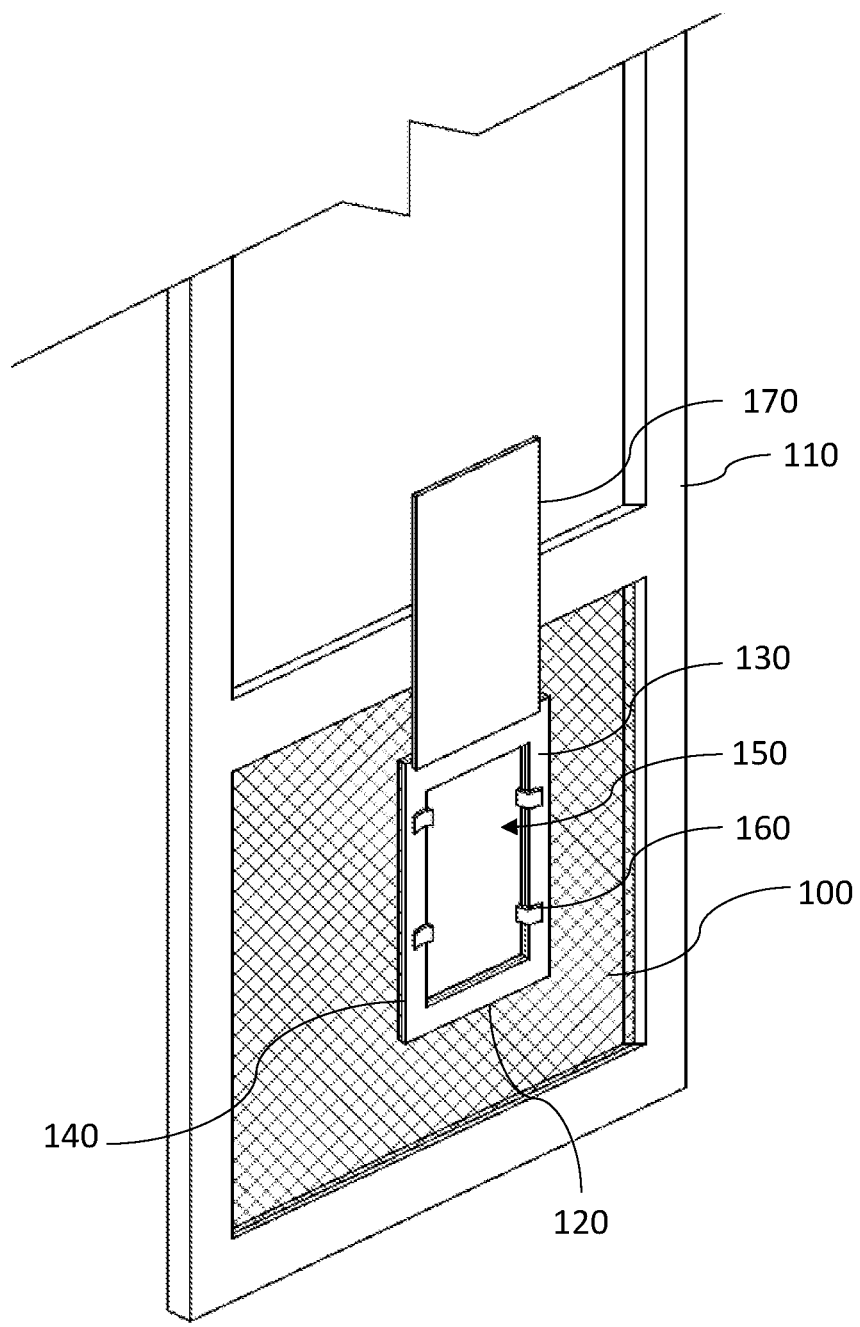
FIG. 1 shows a door frame of a pet enclosure mounting assembly installed in a mesh screen of a door, according to an exemplary embodiment of the present invention.

Referring to FIG. 1, which shows the pet enclosure mounting assembly installed in a mesh screen 100 of a door 110. The pet enclosure mounting assembly can include a first frame 120, also referred to herein as the door frame, that can be installed in a door. The door frame 120 can include a front panel 130 and a rear panel 140 both same size and shape. The first frame 120 can circumscribe a central opening that forms a passage for the pet. Preferably, the first frame 120 can be installed in a mesh screen of the door. To install door frame 120, the front panel 130 can be positioned on the mesh screen 100 of door 110. The front panel 130 can be adjusted till the desired position on the mesh screen can be achieved. Thereafter, a section of the screen within an inner periphery of the front panel can be cut to form a passage 150. Once the section is cut, the rear panel can be overlaid from another side of the door over the front panel, as shown in FIG. 1. The portion of the mesh screen along the passage 150 can be sandwiched between the front panel 130 and the rear panel 140 of the door frame 120. The front panel and the rear panel can be secured using clips 160, wherein the door frame 120 circumscribes the passage 150. The clips 160 can bind the front panel 130 to the rear panel 140, wherein the clips can be secured along the inner periphery of the door frame as shown in FIG. 1. Additionally, to the clips, pins can be used to secure the door frame to the mesh screen, wherein the pins can pass through the apertures in the mesh screen.

A flap 170 can also be provided to close the passage 150. The flap 170 can be mounted in several ways without departing from the scope of the present invention, such as the flap can be slidably or pivotally mounted to the door frame. The flap can provide for closing the passage when required. For example, on a particular day, such as a rainy day, it may not be desired for the dog or cat to go out and so the passage can be manually closed by the flap.

Figure 2:
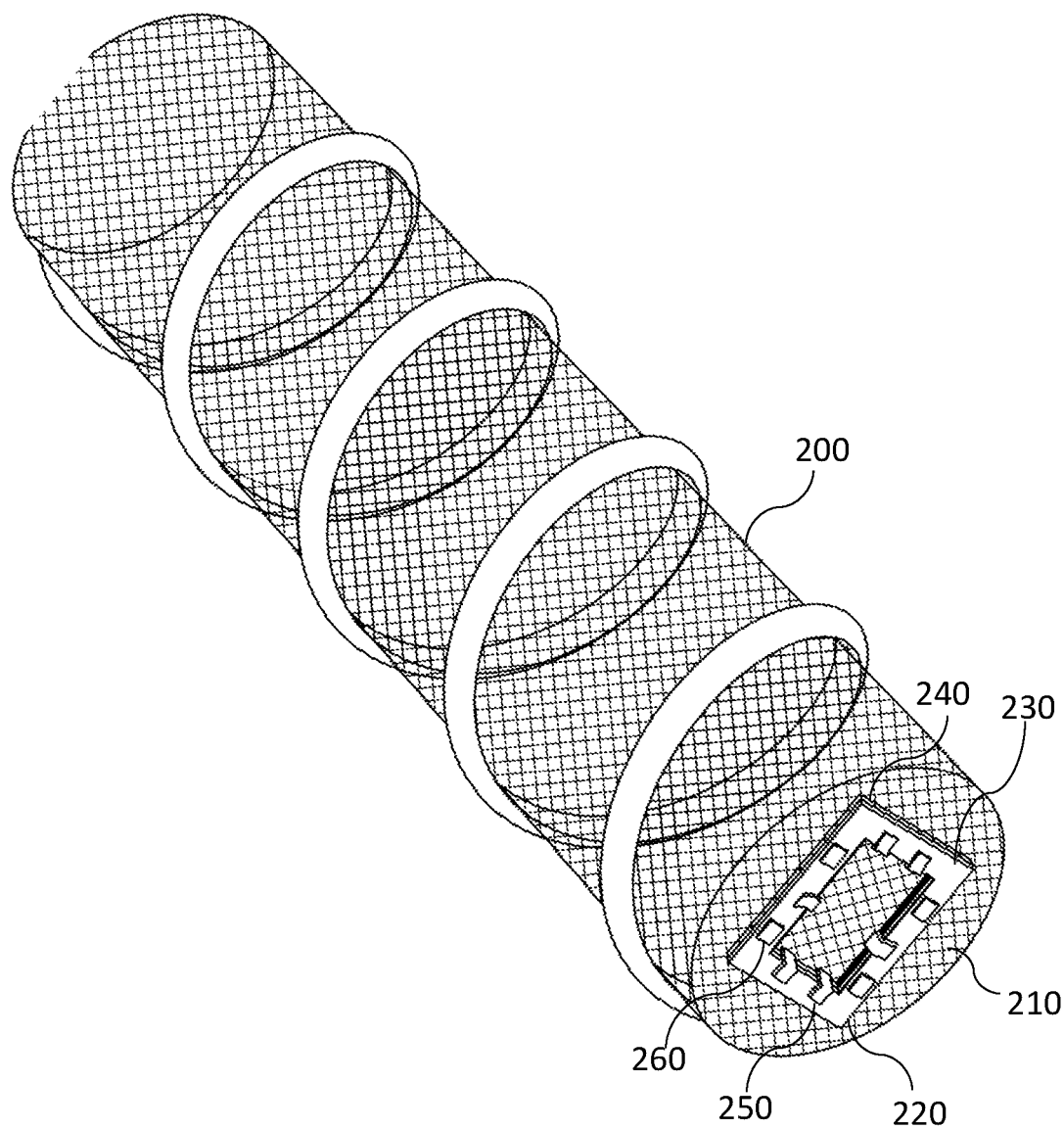
FIG. 2 shows a second frame of the pet enclosure mounting assembly mounted to an outdoor pet enclosure, according to an exemplary embodiment of the present invention.

Referring to FIG. 2, the outdoor pet enclosure 200 can be removably mounted to the door, such as a pet can enter the outdoor pet enclosure 200 through the passage 150 circumscribed by the door frame 120. The outdoor pet enclosure 200 can be of a tunnel shape which can be collapsible and supported in shape by a helical or encircling rod-shaped support. The outdoor pet enclosure 200 can be enclosed by a mosquito-proof mesh 210 and only one side of the tunnel can be open for entry into and exit from the tunnel, referred to herein as an enclosure opening. The mesh wall of the enclosure provides for both outdoor air and landscape visibility, while the pet can safely roam within the enclosure.

The pet enclosure mounting assembly can include a second frame 220 also having a front panel 230 and rear panel 240, both having the same size and shape. The central openings of the first frame and the second frame can be of the same size. The second frame 220 can circumscribe the enclosure opening, wherein the front panel and the rear panel can sandwich a portion of a mesh 210 of the outdoor pet enclosure 200 along with the enclosure opening. The two panels of the second frame 220 can also be secured using clips 250. Additional fasteners, such as rivets and nuts can be used to tighten the two panels of the second frame 220.

The second frame 220 can be coupled to the first frame 120 through magnets, thus removably mounting the outdoor pet enclosure 200 to the mesh screen 100 of the door 110 and that's quickly and easily. The pet enclosure mounting assembly can be dissembled and reinstalled as and when required. The magnets 260 can be strong neodymium magnets that prevent undesired detachment of the outdoor pet enclosure. both the first frame and the second frame can be provided with magnets. In one case, the cut section in the mesh screen can be cut at only three sides and then can be folded outwards at the fourth side and the rear panel of the door frame can be applied also sandwiching a portion of the folded section of the mesh screen. In one case, the clips can flush with the first frame to form a smooth surface. In one case, the two panels of the first frame can be additionally joined using magnets. In one case, the inner surfaces of the front panel and the rear panel of the first frame and the second frame can have ribs or grainy protrusions that may increase the grip between the two panels. The second frame can juxtapose to the first frame, wherein the magnets in the first frame and the second frame can hold the two frames together. The passage in the mesh screen that is circumscribed by the first frame and the enclosure opening that is circumscribed by the second frame can form a continuous passage for the pet to enter the outdoor pet enclosure from inside a home. Both the door frame and the enclosure frame can be made of sturdy and lightweight materials, such as plastic and aluminum.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A method for mounting an outdoor pet enclosure to a mesh screen of a door or a window, the method comprising the steps of:
    providing a pet enclosure mounting assembly comprising:
        a first frame comprising a front panel and a rear panel, the first frame configured to circumscribe a passage in the mesh screen,
        a second frame comprises a front panel and a rear panel,
        wherein the first frame and the second frame comprise magnets to magnetically couple the second frame to the first frame;
    positioning the front panel of the first frame over the mesh screen;
    cutting a section of the mesh screen along an inner periphery of the front panel of the first frame to form the passage, wherein the section in the mesh screen is cut at three sides and then the section is folded outwards at the fourth side;
    positioning the rear panel of the first frame over the front panel of the first frame sandwiching the folded section between the front panel and the rear panel of the first frame;
    fastening the front panel and the rear panel of the first frame using a plurality of fasteners;
    sandwiching a portion of a mesh of the outdoor pet enclosure along an enclosure opening in the outdoor pet enclosure between the front panel and the rear panel of the second frame, wherein the second frame circumscribes the enclosure opening; and
    magnetically coupling the second frame to the first frame, wherein the passage and the enclosure opening forms a path for a pet to enter the outdoor pet enclosure from another side of the door or the window.

2. The method according to claim 1, wherein the plurality of fasteners are clips that clamp the front panel and the rear panel.

3. The method according to claim 1, wherein the outdoor pet enclosure comprises a mesh wall and the enclosure opening through which the pet enters the outdoor pet enclosure.

4. The method according to claim 1, wherein the passage is configured to permit the pet to move from an indoor into the outdoor pet enclosure.

5. The method according to claim 1, wherein the plurality of fasteners are magnets.

6. The method according to claim 1, wherein inner surfaces of the front panel and the rear panel of the first frame comprises ribs or grainy protrusions.

7. A mesh door assembly comprising:
    a mesh screen, a section in the mesh screen has four sides, wherein the section is cut at three sides and folded at a fourth side of the four sides, wherein folding of the section forms a passage in the mesh screen for a pet to pass through;
    a pet enclosure mounting assembly comprising: a first frame comprising a front panel and a rear panel, the first frame configured to circumscribe the passage, wherein the front panel and the rear panel sandwiches the folded section and a portion of the mesh screen along a periphery of the passage, wherein the front panel is secured to the rear panel using a plurality of fasteners;
    an outdoor pet enclosure; and
    a second frame comprising a front panel and a rear panel, the front panel and the rear panel of the second frame sandwiches a portion of a mesh of the outdoor pet enclosure along an opening in the outdoor pet enclosure, the second frame configured to circumscribe the opening of the outdoor pet enclosure,
    wherein, each the first frame and the second frame have a plurality of magnets configured to magnetically couple the first frame to the second frame.

* * * * *